Aug. 23, 1932.   K. BRATRING   1,872,662
TRANSPARENT PAPER, METHOD OF MAKING THE SAME AND
COMPOSITION FOR RENDERING THE SAME TRANSPARENT
Filed June 9, 1928
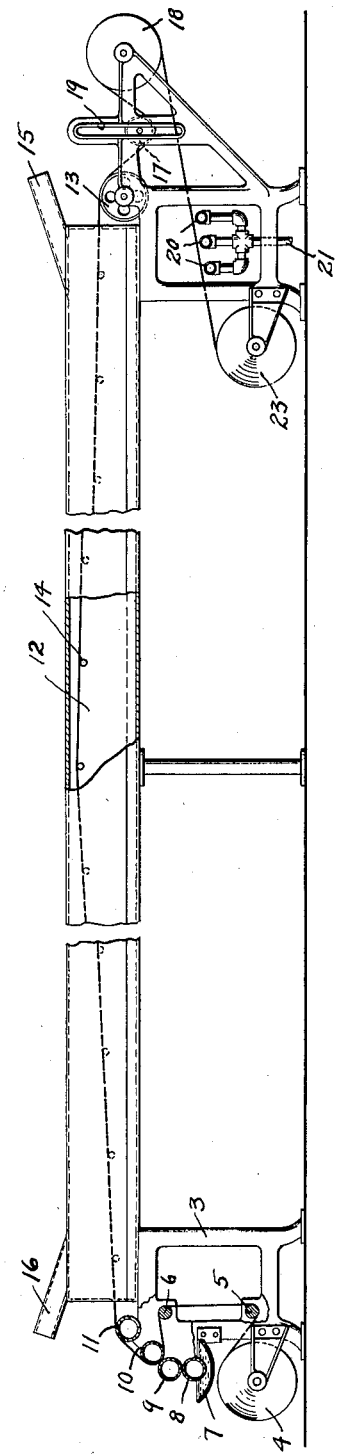
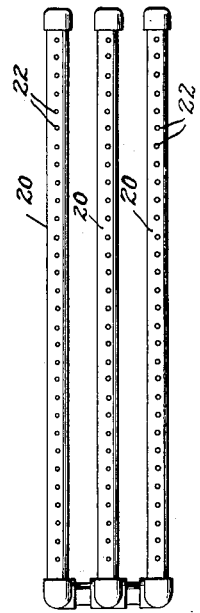
INVENTOR.
Dr. Kurt Bratring
BY
Louis C. French
ATTORNEY.

Patented Aug. 23, 1932                                                                1,872,662

UNITED STATES PATENT OFFICE

KURT BRATRING, OF BERCHEM, ANTWERP, BELGIUM, ASSIGNOR TO JULIUS E. KIEFER, OF MILWAUKEE, WISCONSIN

TRANSPARENT PAPER, METHOD OF MAKING THE SAME AND COMPOSITION FOR RENDERING THE SAME TRANSPARENT

Application filed June 9, 1928. Serial No. 284,124.

The invention relates to transparent paper, the method of making the same and the composition for rendering the same transparent.

Heretofore the commercial attempts that have been made to produce transparent paper by coating the same with various kinds of solutions have resulted in a product that was sticky, tacky and odorous. By the use of composition embodying the invention and the manner of applying the same to glassine paper, a superior, transparent paper product is produced that is odorless. The product preferably contains a softening oil that improves the transparency and frees the paper from tacky, sticky and odorous characteristics.

The invention further consists in the method, the composition and the product hereinafter described and more particularly defined by claims at the conclusion hereof.

In the drawing Fig. 1 is a side elevation view of apparatus for carrying out the process embodying the invention, parts being broken away and parts being shown in section;

Fig. 2 is a plan view of a portion of the apparatus.

In the manufacture of the product embodying the invention, I take one part of light colored, soft copal, such as Manila copal or those fossil gums, resins and copals commercially designated as dammar, Pontianak, mastic, Jauri, Zanzibar, sandarac, Congo and glycerinated resin, known as ester gum, or such other gums based on characteristics of what is known in the trade as Manila copal, and dissolve the same in a suitable solvent, such as alcohol, either denatured, grain or ethyl alcohol. Of the gums, resins or copals above mentioned, I prefer to use soft, light colored Manila copal.

In dissolving the copal in the alcohol, it may be hastened and reduced to a more uniform product by the use of a suitable mechanical mixer and before using the same it is thoroughly filtered so as to obtain a clear solution. As an illustration of one solution suitable for coating, I use one part of the copal to three parts of the solvent, though these proportions may be varied.

In order to prevent the glassine paper subjected to the above described coating from becoming hard and brittle, a small amount, such as two to three per cent by weight, of a suitable softening oil, such as castor oil or olive oil, but preferably castor oil is added to the solution so that the resulting coating or composition when applied to the paper will make the same soft and pliable, thereby preventing cracks or other imperfections to appear in said coated paper. This softening oil also improves the transparency and removes or nullifies those characteristics of the solution that otherwise might tend to make the paper sticky, tacky or odorous. After being treated with this solution the paper is found to be more transparent and odorless than transparent paper heretofore proposed.

If it is desired to color the paper different from its natural color, a suitable dye may be dissolved in the impregnating solution, preferably a dye soluble in alcohol, such as suitable analine dyes.

The glassine paper to be treated is run through any suitable machine by which the solution above described is first coated on one side of the paper and then coated on the other side of the paper, or both sides may be simultaneously coated by the use of suitable machinery. After the paper is coated it is dried, preferably under tension so that calendaring steps are eliminated.

The drawing shows an example of one form of apparatus for carrying out the coating process.

In the drawing the numeral 3 designates the frame of the machine, 4 a supply roll of glassine paper, 5 and 6 guide rolls, 7 a trough containing the coating solution, 8 a feed roll for the solution, 9 a spreading roll adapted to contact with the paper on its passage from the roll 6 over the roll 10 for coating one side thereof, after which the paper passes over a roller 11, through a drying chamber 12 and thence over a heated roller 13, which may be steam heated.

In the drying chamber the paper passes over roller supports 14 and heated air is introduced through the inlet 15 at one end of the chamber and passes out through the outlet 16 at the other end of the chamber.

The paper is tensioned during drying in any suitable manner, as, for instance, by interposing a floating roller 17 between the roller 13 and the roller 18, said roller 17 being slidably mounted in vertically disposed guides 19 and being of a weight sufficient to exert the necessary tension on the coated paper.

After passing the roller 18 the paper may be subjected to blasts of cold air, as by means of pipes 20 supplied with blasts of air through a pipe 21 provided with blast openings 22. Thereafter the paper is wound up upon a roller 23.

In this way one side of the paper is coated and the same process may be carried out by shifting the paper on the roller 23 to the position of the supply roller and then coating the other side, as above described.

By the term "copal" I mean to include those fossil gums, resins and copals commercially designated and known as Dammar, Pontianak, mastic, Jauri, Zanzibar, sandarac Congo and glycerinated resin, known as ester gum, and such other gums as have the same characteristics as the above mentioned gums.

I desire it to be understood that this invention is not to be limited to any specific proportion of parts of the treating solution except insofar as such limitations are included in the claims.

What I claim as my invention is:

1. As a new article of manufacture, glassine paper which has been treated with a solution comprising substantially one part of light colored varnish gum having the characteristics of copal, three parts of a solvent for said gum and two to three per cent by weight of a softening oil.

2. As a new article of manufacture, colored glassine paper which has been treated with a solution comprising substantially one part of light colored varnish gum having the characteristics of copal, three parts of a solvent for said gum, a small amount of a softening oil, and an organic coloring dye.

3. In the process of making transparent paper, the treating of glassine paper with a composition comprising a small amount of a softening oil and one part of light colored varnish gum having the characteristics of copal dissolved in three parts of a solvent for said gum.

In testimony whereof, I affix my signature.

DR. KURT BRATRING.